United States Patent
Simone et al.

(10) Patent No.: US 8,557,350 B2
(45) Date of Patent: Oct. 15, 2013

(54) METHOD FOR BONDING A LAYER OF SILICONE TO A SUBSTRATE OF METHACRYLATE POLYMER

(75) Inventors: Giuseppina Simone, Formicola (IT); Gerado Perozziello, Bologna (IT); Gianni Medoro, Casalecchio di Reno (IT)

(73) Assignee: Silicon Biosystems S.p.A., Bologna (IT)

( * ) Notice: Subject to any disclaimer, the term of this patent is extended or adjusted under 35 U.S.C. 154(b) by 533 days.

(21) Appl. No.: 12/673,273

(22) PCT Filed: Aug. 13, 2008

(86) PCT No.: PCT/IB2008/002130
§ 371 (c)(1),
(2), (4) Date: Feb. 12, 2010

(87) PCT Pub. No.: WO2009/022222
PCT Pub. Date: Feb. 19, 2009

(65) Prior Publication Data
US 2011/0193006 A1      Aug. 11, 2011

(30) Foreign Application Priority Data
Aug. 13, 2007 (IT) .............................. BO2007A0588

(51) Int. Cl.
*H05H 1/00* (2006.01)
*B05D 5/10* (2006.01)
*B05D 3/00* (2006.01)
*B29C 65/00* (2006.01)
*B32B 37/00* (2006.01)

(52) U.S. Cl.
USPC ........ 427/535; 427/207.1; 427/299; 427/536; 156/60; 156/272.2; 156/272.6

(58) Field of Classification Search
USPC ........ 156/60, 272.2, 272.6, 272.8; 427/207.1, 427/299, 307, 535, 536, 539
See application file for complete search history.

(56) References Cited

U.S. PATENT DOCUMENTS

| | | | | |
|---|---|---|---|---|
| 3,312,587 A | * | 4/1967 | Wilson | 428/213 |
| 5,378,535 A | * | 1/1995 | Moncur et al. | 428/335 |
| 5,488,957 A | * | 2/1996 | Frey et al. | 600/472 |
| 6,577,802 B1 | * | 6/2003 | Chien | 385/128 |
| 6,743,516 B2 | * | 6/2004 | Murphy et al. | 428/447 |

(Continued)

FOREIGN PATENT DOCUMENTS

| | | |
|---|---|---|
| EP | 1179585 | 2/2002 |
| EP | 1304388 | 4/2003 |

(Continued)

OTHER PUBLICATIONS

Partial International Search Report in corresponding PCT/IB2008/002130.

(Continued)

*Primary Examiner* — Michael Wieczorek
(74) *Attorney, Agent, or Firm* — Marshall, Gerstein & Borun LLP (57) ABSTRACT

Method of bonding a layer (S) of silicone to a substrate (4') of methacrylic polymer; the method involves positioning between the methacrylate polymer and the silicone a layer (9) of an organosilane having the formula $R^1Si(R^2)_3$, in which $R^2$ is OH and $R^1$ is a methacrylic residue.

17 Claims, 8 Drawing Sheets

(56) References Cited

U.S. PATENT DOCUMENTS

| | | | |
|---|---|---|---|
| 6,830,729 | B1 | 12/2004 | Holl et al. |
| 2003/0044832 | A1 | 3/2003 | Blankenstein |
| 2003/0073110 | A1 | 4/2003 | Aritomi et al. |
| 2004/0209354 | A1 | 10/2004 | Mathies et al. |
| 2006/0014083 | A1* | 1/2006 | Carlson .................. 430/5 |
| 2006/0086309 | A1 | 4/2006 | Manger et al. |
| 2006/0088666 | A1* | 4/2006 | Kobrin et al. ........... 427/569 |
| 2006/0177815 | A1 | 8/2006 | Soh et al. |
| 2007/0051412 | A1 | 3/2007 | Heath et al. |
| 2011/0193006 | A1 | 8/2011 | Simone et al. |

FOREIGN PATENT DOCUMENTS

| | | |
|---|---|---|
| JP | 2005257283 A | 9/2005 |
| WO | WO-00/69565 | 11/2000 |
| WO | WO-2005060432 | 7/2005 |
| WO | WO-2007/010367 | 1/2007 |
| WO | WO-2007/049120 | 5/2007 |
| WO | WO2007/058433 A1 | 5/2007 |
| WO | WO2008/032128 A1 | 3/2008 |

OTHER PUBLICATIONS

Extract No. XP002563471 from Database WPI Week 200573 (2005).

Bhattacharya et al., Studies on surface wettability of poly(dimethyl) siloxane (PDMS) and glass under oxygen-plasma treatment and correlation with bond strength, J. Microelectromechanical Systems, 14(3):590-7 (2005).

Kim et al., Fabrication of nanostructures of polyethylene glycol for applications to protein adsorption and cell adhesion, Nanotechnology, 16(10):2420-6 (2005).

Lim et al., Fabrication techniques for grating-based optical devices, J. Vac. Sci. Technol. B, 17(6): 3208 (Nov./Dec. 1999).

Zhang et al., Microchemostat-microbial continuous culture in a polymer-based instrumented microbioreactor, Lab Chip, 6:906-13 (2006).

Brown et al., Fabrication and characterization of poly(methylmethacrylate) microfluidic devices bonded using surface modifications and solvents, Lab Chip, 6:66-73 (2006).

Haubert et al., PDMS bonding by means of a portable, low-cost corona system, Lab Chip, 6(12):1548-9.

Patel et al., Control of cell adhesion on poly(methyl methacrylate), Biomaterials, 27(14):2890-7 (2006).

Shirahata et al., Ultrathin Poly(ethylene glycol) Monolayers Formed by Chemical Vapor Deposition on Silicon Substrates, J. Nanosci. Nanotechnol., 6(6):1695-700 (2006).

Yu et al., High Resolution Printing of DNA Feature on Poly(methyl methacrylate) Substrates Using Supramolecular Nano-Stamping, J. Am. Chem. Soc., 127:16774-5 (2005).

* cited by examiner

METHOD FOR BONDING A LAYER OF SILICONE TO A SUBSTRATE OF METHACRYLATE POLYMER

CROSS-REFERENCE TO RELATED APPLICATIONS

This application is the U.S. national phase of International Application No. PCT/IB2008/002130, filed Aug. 13, 2008, which claims the benefit of Italian Patent Application No. BO 2007A000588, filed Aug. 13, 2007.

TECHNICAL FIELD

The present invention relates to a method for bonding a substrate with at least one layer of silicone, an article that can be obtained therefrom and a valve comprising said article. The present invention furthermore relates to a method for the selective deposition of a material on a substrate, an article that can be obtained therefrom and a valve comprising said article.

BACKGROUND ART

In the most advanced fields of the current technology there is an increasing demand for articles, also of micrometric dimensions, which combine characteristics of different materials. Consequently there is a great demand for new technologies for connection in a stable manner and/or in selected areas of materials which are chemically different. The processes proposed so far, however, are not always able to guarantee satisfactory results.

In particular, in the field of microfluidics, the production of microvalves having an element in silicone connected to a support made of a different material is extremely important.

The bond between the silicone membrane and the support, which is usually connected to microfluidic channels, can be achieved by different methods. In said regard, thermal bonding [L. Brown, et. al., *Lab on a Chip* 2006, 6, 66-73], the use of appropriate adhesives and furthermore the use of dopants have been proposed to modify the properties of materials.

Nevertheless, the possibility of connecting the parts in question by the formation of irreversible chemical bonds is still unexplored in this sector. This is due partly to the difficulty of promoting the chemical interaction between phases, the affinity of which is, by nature, negligible, and partly to the numerous problems that arise concerning the production process.

A barrier to the formation of chemical bonds between the support (for example in PMMA) and the silicones is represented by the elastomers which are chemically inert and strongly hydrophobic. The increase in the surface tension of the silicones can be modulated by plasma treatments or by corona discharge (see for example Kathryn Haubert, Tracy Drier and David Beebe Lab Chip, 2006, 6, 1548-1549; BHATTACHARYA Shantanu; DATTA Arindom; BERG Jordan M.; GANGOPADHYAY Shubhra Journal of microelectromechanical systems 2005, vol. 14, no 3, pp. 590-597). However, the results obtained have shown little effectiveness.

In many applications [Microchemostat—microbial continuous culture in a polymer-based, instrumented microbioreactor Zhang, Z.; Bocazzi, P.; Choi, N. G.; Perozziello, Gerardo; Sinskey, A. J.; Jensen, K. F. LAB ON A CHIP (ISSN:), vol: 6, issue: 7, pages: 906-913, 2006] surface modification of the PMMA is necessary to prevent cellular adhesion [S. Patel et al./Biomaterials 27 (2006) 2890-2897].

Furthermore, for many other applications it is important to obtain selective adhesion of a material on a substrate [Ultrathin poly(ethylene glycol) monolayers formed by chemical vapor deposition on silicon substrates—SHIRAHATA Naoto; HOZUMI Atsushi Journal of nanoscience and nanotechnology (J. nanosci. nanotechnol.) Self-Assembled Nanomaterials 2006, vol. 6, no 6 (50 ref.), p. 1695-1700]. Examples in this regard are optical guides [Lim, H. M: Murphy, T. E. J. Vac. Sci. Technol. B 17(6), November/December 1999] and the deposition of SAM [Yu, A. A. Savas, T JACS 127 (2005) 16774-16775]. More generally, all processes of partial functionalisation of surfaces by means of primers are performed using selective masks.

However, the use of masks during the deposition phase makes the process more complex in some cases. In addition to a greater number of operations of the process itself, the mask must be carefully designed in terms of dimensions (thickness, oversizing of the exposed zones to compensate the shadow effects) and component material. This must be compatible as far as possible with the characteristics of the material to be deposited in order to prevent their incompatibility producing shadow zones.

DISCLOSURE OF INVENTION

The object of the present invention is to provide a method, an article that can be obtained by means of said method and a valve comprising said article which allow the drawbacks of the known art to be overcome, at least partially, and are at the same time easy and inexpensive to produce.

The present invention provides a method, an article that can be obtained by means of said method and a valve in accordance with the following independent claims and, preferably, with any one of the claims depending directly or indirectly on the independent claims.

Unless specified otherwise, in this text the following terms have the meaning indicated below.

Selective deposition of a material on a surface with respect to another means that the majority of and advantageously all the material is deposited on that surface.

Selective bond of a first material with a second means that the majority of and advantageously all the first material bonds with the second.

The term "alkoxy" indicates an alkyl group bonded with the silicon via an atom of oxygen.

The term "hydroxy" indicates the group —OH.

The term "$C_x$-$C_y$" indicates a group with a minimum of x atoms of carbon and a maximum of y atoms of carbon.

The term "organosilane" indicates a silane having at least one silicon-carbon bond. Advantageously, an organosilane has an organic residue (in particular, substantially lipophilic) bonded to the silicon by means of the silicon-carbon bond.

Lipophilic residue means a residue which, taken separately from the remaining part of the molecule, has greater solubility in EtOH (ethyl alcohol) than in water.

Angle of contact of a material means the angle of contact between said material in the solid phase and the water.

BRIEF DESCRIPTION OF THE DRAWINGS

The invention, is described below with reference to the accompanying drawings, which illustrate some non-limiting embodiment examples, in which.

BEST MODE FOR CARRYING OUT THE INVENTION

According to a first aspect of the present invention a method is provided for bonding a substrate with at least one layer of silicone in order to obtain a composite; the method comprises a first phase of application, during which a first layer comprising at least one organosilane is applied on a first surface of the substrate, a second phase of application, during which a second layer comprising (advantageously consisting of) silicone (in particular silicone rubbers) is applied to the first layer, the organosilane having, during the second phase of application, at least one silicon bonded to at least one hydroxy.

It is important to note that, according to some embodiments, the organosilane does not have, before the second phase of application, any silicon bonded with a hydroxy. Advantageously, before the second phase of application, the organosilane has at least one silicon bonded with at least one (advantageously three) substituent chosen from the group consisting of: hydroxy and alkoxy $C_1$-$C_6$, (advantageously $C_2$-$C_6$, advantageously $C_1$-$C_3$).

The alkoxy is, advantageously, hydrolysed before or during the second phase of application. In other words, during or after the first phase of application the organosilane having at least one silicon bonded with at least one alkoxy $C_1$-$C_6$ can be chemically modified so as to present one hydroxy bonded with one silicon. For example, when a vapour deposition was performed of certain trimethoxy organosilanes (in particular, TMSPM) in particular conditions it was experimentally observed that a first layer was obtained containing corresponding trihydroxy organosilanes (the hydrolysis reaction occurs presumably during the deposition due to the evaporation temperature of the organosilane and the humidity present in the air). Alternatively or in addition, the hydrolysis can be induced subsequently to the deposition (i.e. after the first phase of application), for example by treating the first layer with energy (heat or plasma) in the presence of water and/or humidity and/or water vapour.

According to some embodiments, the first surface of the substrate has an angle of contact of less than 90°, advantageously less than 80°. Advantageously, the first surface has an angle of contact greater than 50°, in particular greater than 60°. It should be noted that the angle of contact is a measurement of the hydrophilicity-hydrophobicity and can be measured following the methodology described in [J. C. Berg, Wettability, Marcel Dekker, N.Y. (193)].

It is important to underline that the organosilane acts substantially as a bridge between substrate and silicone since it is similar to the substrate and simultaneously is able to chemically bond with the silicone.

In accordance with some embodiments, the first surface comprises at least one polymeric material. Advantageously, the polymeric material is an acrylic polymer, in particular PMMA (polymethylmethacrylate).

According to some embodiments, during the second phase of application, the organosilane has a silicon bonded to three hydroxies (hydroxy groups).

According to some embodiments, during the second phase of application, the organosilane has formula $R^1Si(R^2)_3$, in which at least one $R^2$ represents a hydroxy; $R^1$ represents a residue having a carbon bonded directly to the silicon, advantageously it is an organic residue (in particular, $R^1$ represents a lipophilic residue). Advantageously, each $R^2$ represents a respective hydroxy. Advantageously, $R^1$ represents a methacrylic residue. In particular, $R^1$ has the following structure:

in which $R^3$ indicates an alkyl $C_1$-$C_6$, advantageously $C_1$-$C_3$.

Advantageously, during the first phase of application, the organosilane, which is applied to the substrate, has a silicon bonded to at least one hydroxy. Advantageously, during the first phase of application, the organosilane, which is applied to the substrate, has a silicon bonded to three hydroxies.

In particular, during the first phase of application, the organosilane, which is applied to the substrate, has formula $R^1Si(R^2)_3$, in which $R^1$ is defined as above and $R^2$ is chosen from the group consisting of hydroxy and alkoxy $C_1$-$C_6$ (advantageously $C_2$-$C_6$, advantageously $C_1$-$C_3$). Advantageously, $R^2$ is defined as above.

According to some embodiments, the silicone (in particular the silicone rubber) has the following formula:

$$[R_2SiO]_n$$

in which n is a whole number greater than 1, in particular greater than 4 (advantageously greater than 10) and each R is chosen, independently of the others, from the group consisting of methyl, ethyl, propyl. Advantageously, R is a methyl.

According to some embodiments, an activation phase is scheduled, subsequent to the first phase of application, during which the silicone and the organosilane are activated superficially by means of plasma treatment.

According to some preferred embodiments, the difference between the angles of contact of the first surface and of the organosilane is less than 20°. Advantageously, the difference between the angles of contact of the first surface and of the organosilane is less than 10°, in particular 5°.

According to preferred embodiments, during the first phase of application, the first layer is applied by means of evaporation and subsequent condensation of the organosilane or atomisation (advantageously evaporation).

According to other embodiments, the first layer is applied by means of dispensing, dip or spin coating, printing and subsequent drying.

According to some embodiments, a surface treatment phase is scheduled, which is previous to the first phase of application and during which at least either the first or second surface (in particular, the second surface) of the substrate is treated so that the first surface has an angle of contact greater than an angle of contact of the second surface. During the first phase of application, the organosilane deposits selectively on the first surface of the substrate with respect to the second surface.

According to preferred embodiments, after the surface treatment phase, the difference between the angles of contact of the first and second surface is at least 30°, advantageously at least 37°, in particular at least 45°. The embodiments in which the difference between the angles of contact of the first and the second surface is at least 50° are particularly advantageous.

Advantageously the difference between the angles of contact of the second surface and of the organosilane is greater than 30°.

Preferably, during the surface treatment phase, either the first or the second surface of the substrate is treated in order to give it a roughness different from the roughness of the other surface. In particular, during the surface treatment phase, either the first or the second surface undergoes plasma treatment.

According to some embodiments, the organosilane deposits on the first and a second surface. The method comprises a phase of removal, during which the organosilane is selectively removed from the second surface, remaining on the first surface.

Advantageously, after the first phase of application and before the phase of removal, the first layer is covered by a mask (in particular, made of metal) while the second surface is left exposed.

According to specific embodiments, the organosilane is removed from the second surface by means of plasma incision.

In view of the above it should be noted that during the second phase of application the silicone bonds selectively with the organosilane.

In accordance with some embodiments, the substrate comprises a second surface, the angle of contact of which is below that of the first surface. The substrate comprises at least two channels, each of which has a respective surface aperture; the surface apertures are positioned beside each other at the level of the second surface. The first surface extends around the second surface. During the second phase of application, the second layer is positioned above the second surface of the substrate so that a perimeter zone of the second layer positioned above the first layer bonds with the first layer; the second layer has a deformable central zone.

It is important to note that the method described above allows a layer of silicone to be connected in a substantially stable manner to a substrate of a material which can be quite different, having a low level of compatibility with the silicone.

According to a further aspect of the present invention, an article is produced which is obtained or can be obtained by means of the method described above. A particular example of the article described above is illustrated in FIG. 7 attached.

According to a further aspect of the present invention, a valve is produced comprising an article as described above and an actuator (for example pneumatic or piezoelectric) positioned on the opposite side of the second layer with respect to said surface apertures to deform the central zone of the second layer and, therefore, connect or maintain isolated the two channels.

According to a fourth aspect of the present invention, a method is provided for the selective deposition of a material on a substrate; the method comprises a first phase of application, during which the material is selectively deposited on a first surface of the substrate with respect to a second surface of the substrate in order to obtain a first layer. The first surface has a different angle of contact from the second surface. During the first phase of application, the material is applied by means of evaporation and subsequent condensation on the substrate. Alternatively, during the first phase of application, the material is applied by means of atomisation and subsequent deposition on the substrate.

When the material is an unsaturated organosilane (for example a methacrylate), the material tends to polymerise, increasing its angle of contact.

According to preferred embodiments, the difference between the angles of contact of the first and the second surface is at least 30°, advantageously at least 37°, in particular at least 45°. The embodiments in which the difference between the angles of contact of the first and second surface is at least 50° are particularly advantageous.

Advantageously, the difference between the angles of contact of the material and of the first surface is less than the difference between the angles of contact of the material and the second surface, in particular the difference between the angles of contact of the material and the second surface is greater than 30°.

According to some preferred embodiments, the difference between the angles of contact of the first surface and the organosilane is below 20°. Advantageously, the difference between the angles of contact of the first surface and the material is below 10°, in particular 5°.

According to some embodiments, a surface treatment phase is scheduled previous to the first phase of application, during which either the first or the second surface (in particular, the second surface) of the substrate is treated so as to present an angle of contact different from an angle of contact of the other surface. In particular, during the surface treatment phase, either the first or the second surface of the substrate is treated in order to give it a different roughness from the roughness of the other surface.

According to some embodiments, during the surface treatment phase either the first or the second surface undergoes a plasma treatment.

Advantageously, the second surface is treated in order to give it an angle of contact lower than the angle of contact of the first surface.

In accordance with some embodiments, a second phase of application is scheduled, as defined in the first aspect of the present invention.

According to some embodiments, said material comprises an organosilane as defined in the first aspect of the present invention.

In accordance with some embodiments, the substrate is as defined in the first aspect of the present invention.

Advantageously, the method comprises a third phase of application during which a layer of PEG is applied by means of evaporation or atomisation with subsequent condensation.

The method described above permits selective deposition of the material on the substrate in a simple inexpensive way. In particular, there is no need for masks, which can limit the quality of the deposition due to the shadow effect. The method without mask speeds up the process, permitting the elimination of some operations.

According to a further aspect of the present invention, an article is produced, obtained or can be obtained by means of the method described above. A particular example of the article described above is illustrated in the attached FIG. 7.

According to some embodiments, the article comprises a second layer which is bonded to the first layer. The substrate comprises at least two channels, each of which has a respective surface aperture; the surface apertures are positioned beside each other at the level of the second surface. The first layer extends around the second surface; the second layer is positioned above the second surface in order to present a perimeter zone bonded to the first layer. The second layer has a deformable central zone.

According to a further aspect of the present invention, a valve is produced comprising an article as described above and a pneumatic actuator positioned on the opposite side of the second layer with respect to said surface apertures to deform the central zone of the second surface and, therefore, connect or maintain isolated the two channels.

According to a further aspect of the present invention, a microfluidic system comprising a valve as defined above is provided.

Microfluidic system means a system (device) having one or more fluid paths (often called channels, microchannels, incisions, cavities) having a cross section with diameter of less than 1000 μm.

The present invention can also be used for applications that involve modifying surfaces to prevent cellular adhesion [Microchemostat—microbial continuous culture in a polymer-based, instrumented microbioreactor Zhang, Z.; Bocazzi, P.; Choi, H. G.; Perozziello, Gerardo; Sinskey, A. J.; Jensen, K. F. LAB ON A CHIP (ISSN:), vol: 6, issue: 7, pages: 906-913, 2006] [S. Patel et al./Biomaterials 27 (2006) 2890-2897] or for applications involving selective adhesion of the substrate, i.e. only in specific regions. One of the most important advantages deriving from the application of said method lies in the possibility of avoiding the drawbacks relative to the mask component material in the traditional processes (i.e. PDMS) [P Kim1, D H Kim2, B Kim3, S K Choi4, S H Lee4, A Khademhosseini5, R Langer5 and K Y Suh1-6 Nanotechnology 16 (2005) 2420-2426].

Further characteristics of the present invention will emerge from the following description of merely illustrative and non-limiting examples.

EXAMPLE 1

Figure 7:
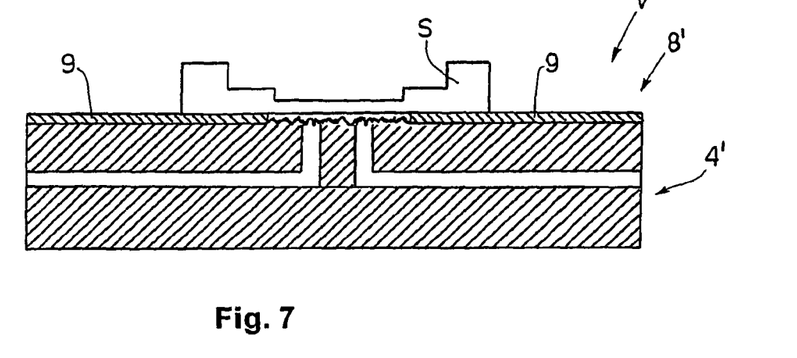

This example describes the production of a valve element V (FIG. 7).

Figure 1:
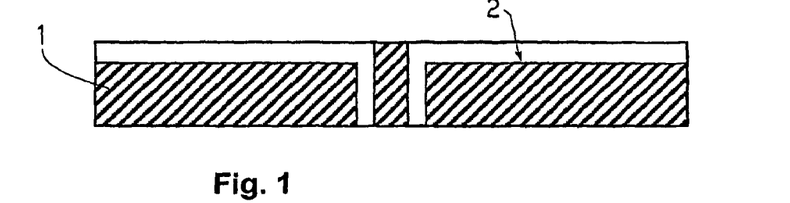
FIGS. 1-7 illustrate the various phases of production of a valve in accordance with the present invention.
Figure 2:
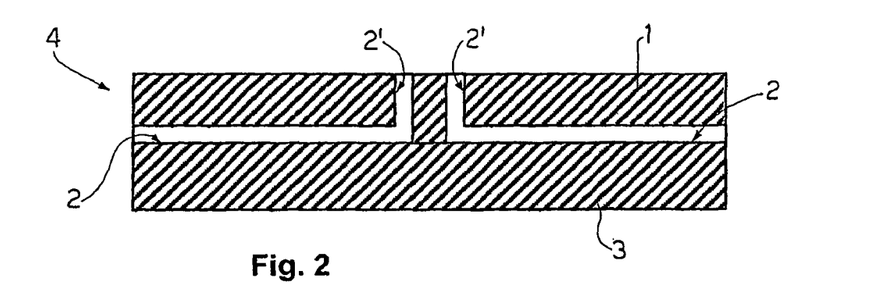

An element 1 of PMMA (polymethylmethacrylate) (thickness 1 mm, width 70 mm, height 70 mm) was milled to obtain channels 2 (diameter approximately 200 μm) (FIG. 2) and then superimposed on and glued to a further element 3 of PMMA (thickness 1 mm, width 70 mm, height 70 mm) to obtain a substrate 4. The gluing was achieved by following the method described in Lab Chip, 2006, 6, 66-73.

Figure 3:
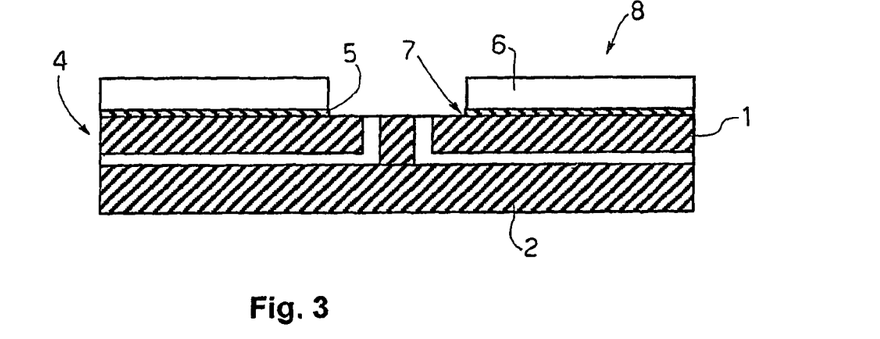
Figure 9:
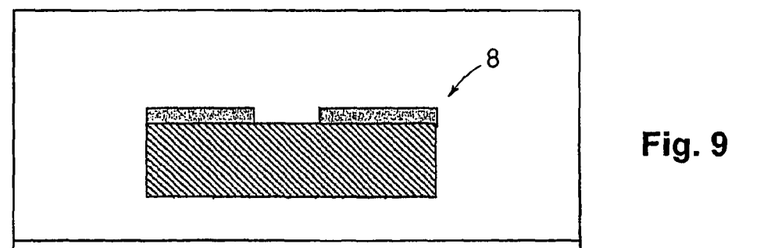
FIGS. 9-12 illustrate different phases of selective deposition of an organosilane on a polymeric substrate.
Figure 10:
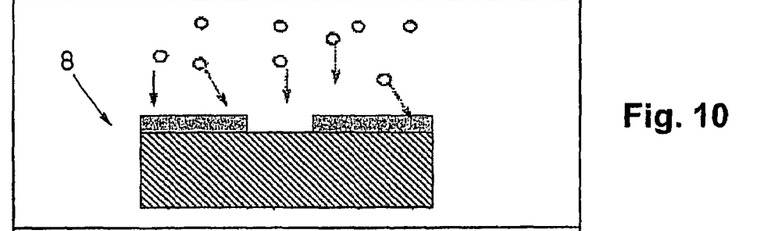

A silicone mask 5 (thickness 1.5 mm) and a steel mask 6 (thickness 2 mm) were superimposed on the substrate 4 in PMMA in order to leave a circle 7 (diameter 4 mm) unprotected and obtain a composite 8 (FIGS. 3 and 9). The composite 8 was placed inside a plasma reactor (Gambetti Plasma, Modello Tucano) modified so that one of the two electrodes were the composite 8 (in particular the steel mask 6). The composite 8 was treated (as shown in FIG. 10) using the parameters given in table 1.

TABLE 1

| Plasma erosion parameters | |
|---|---|
| Power, W | 140 |
| Voltage, V | 240 |
| Pressure, mbar | 0.8-0.9 |
| Time, sec | 280 |

At this point, the silicone mask 5 and the steel mask 6 were removed (FIG. 11) in order to obtain a substrate 4'.

Figure 8:
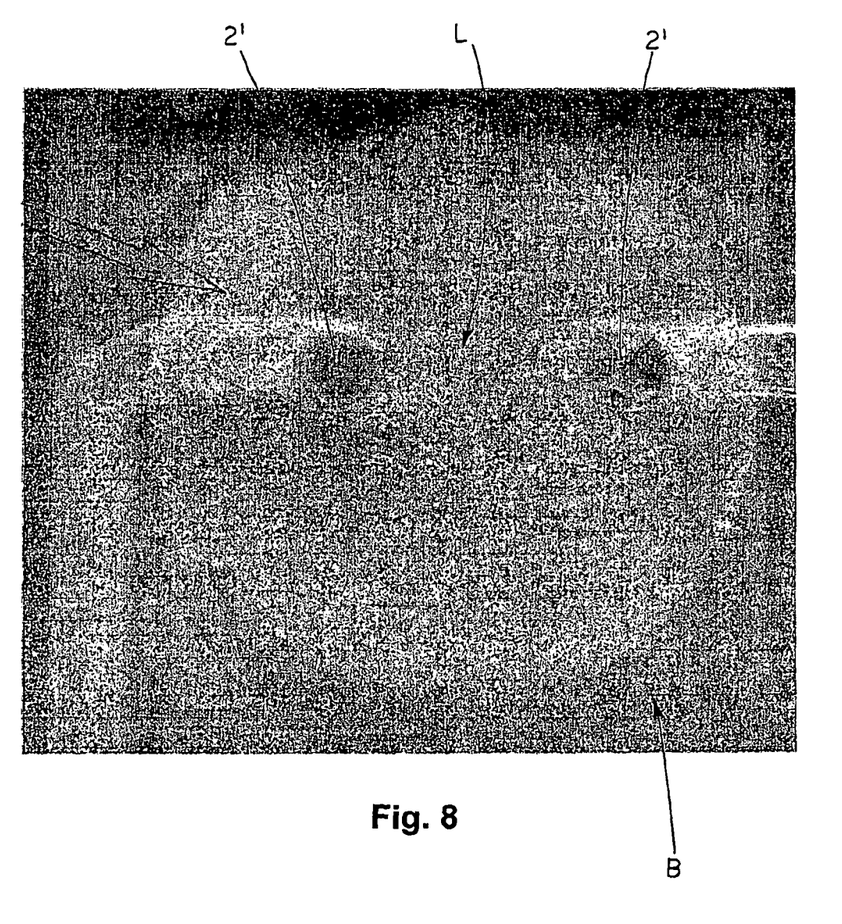
FIG. 8 is a photograph of a substrate which has undergone selective plasma treatment.
Figure 11:
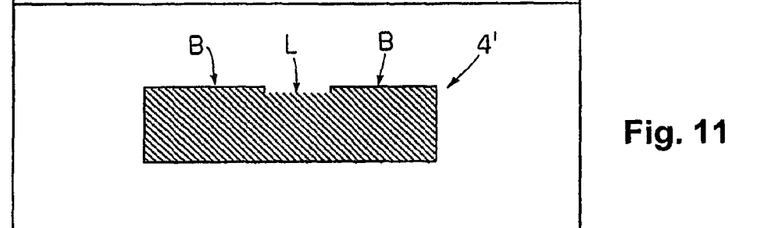

At the end of said operation, due to the increased roughness resulting from the plasma treatment, a surface of the substrate 4' takes on an opaque colour (FIGS. 11 and 8). Said surface has increased hydrophilic characteristics, in fact the drop of water expands completely on the surface treated. In FIG. 11, the area with highest hydrophilicity is indicated by L, the areas with greatest hydrophobicity are indicated by B.

Figure 12:
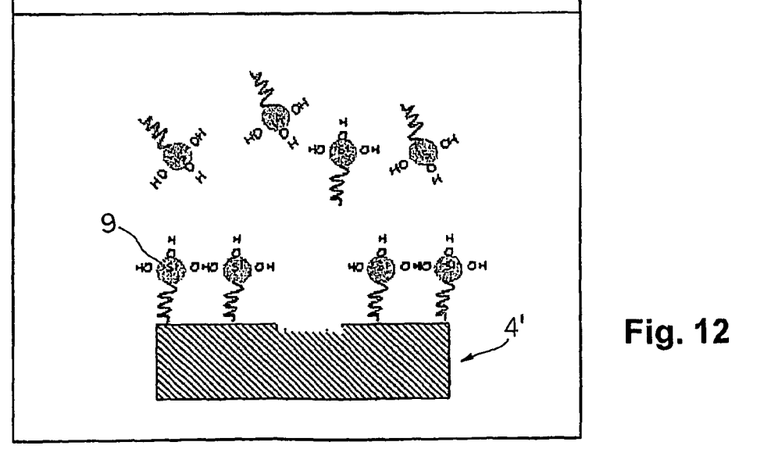

At this point, the areas B have been selectively coated with a layer 9 (with thickness of approximately 1 μm) of 3-(trihydroxysilylpropyl)methacrylate (FIGS. 12 and 4) [the 3-(trihydroxysilylpropyl)methacrylate was produced as illustrated in example 2].

Figure 13:
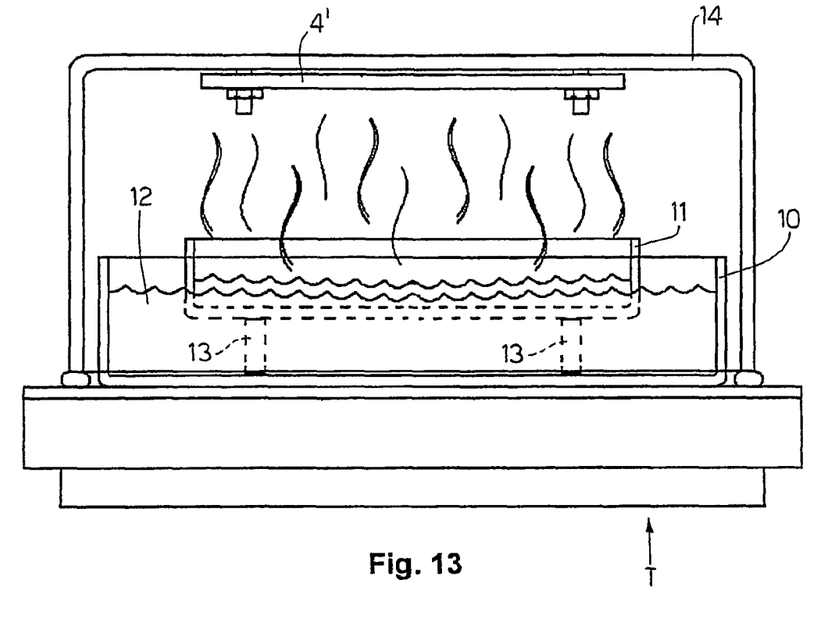
FIG. 13 schematically illustrates a device for producing a coating.

FIG. 13 shows the set-up used to produce the coating. Two Petri dishes 10 and 11 with dimensions of 20 and 10 cm respectively and height of 2 cm were placed on a heating plate. Paraffin 12 was poured into the Petri dish 10 to guarantee uniformity of the temperature while the internal Petri dish 11 contains the 3-(trihydroxysilylpropyl)methacrylate. The level of the paraffin 12 must ensure that the Petri dish 11 is uniformly immersed. The height of the 3-(trihydroxysilylpropyl)methacrylate inside the Petri dish 11 was 5 mm.

The Petri dish 11 was moved away from the heat source T by means of spacers 13. A temperature probe was used to monitor the temperature inside the saturation chamber. A temperature of approximately 60° C. was maintained. The substrate 4' was fixed by means of screws to a cover 14 of the Petri dish 10 and exposed for 15 minutes to the vapour of 3-(trihydroxysilylpropyl)methacrylate. The heat source T maintained a substantially uniform temperature throughout its upper surface.

A composite 8' (FIG. 4) thus obtained and a membrane S of PDMS polydimethylsiloxane (PDMS) (FIG. 5) were treated in a plasma reactor (Gambetti Plasma, Modello Tucano) using the parameters given in table 2 in a mixture of $O_2/N_2$.

TABLE 2

| Plasma activation | |
|---|---|
| Power, W | 40 |
| Voltage, V | 360 |
| Pressure, mbar | 0.3-0.4 |
| Time, sec | 35 |

Figure 14:
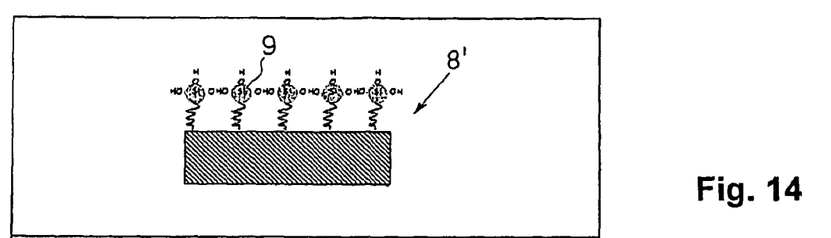
FIGS. 14-17 illustrate different treatment phases to obtain a bond between a silicone and the organosilane.
Figure 15:
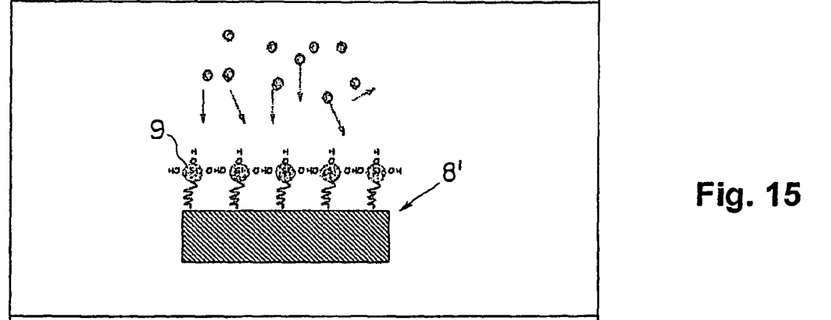
Figure 16:
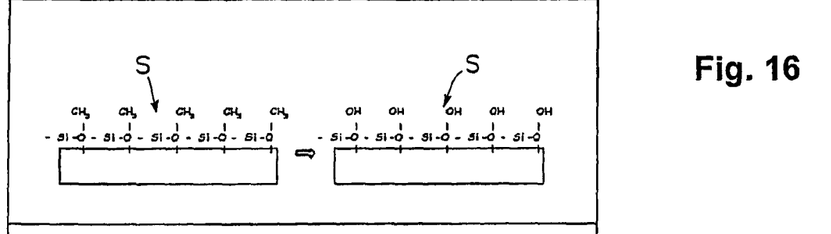

The plasma treatment is illustrated in FIGS. 14-16: FIG. 14 illustrates a portion of the composite 8'; FIG. 15 illustrates the plasma treatment of the portion of FIG. 15; FIG. 16 illustrates the plasma treatment of the membrane S.

Figure 6:
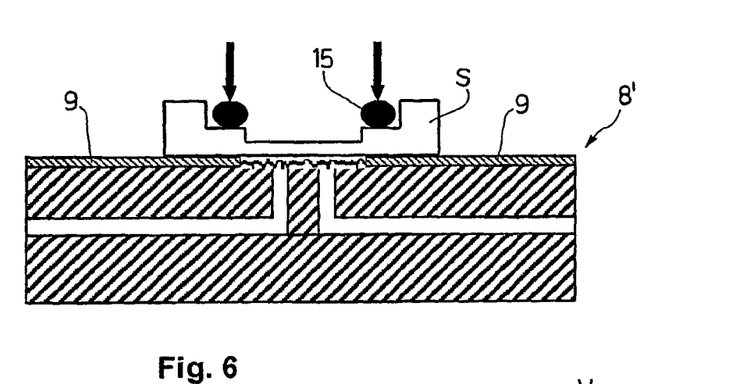
Figure 17:
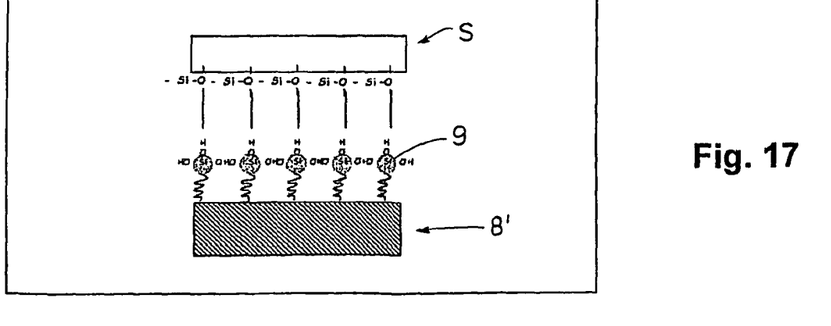

The membrane S was then superimposed on the composite 8' and a circular crown 15 was pressed onto the membrane S (force applied 5-6 Kg, time 1 hour, temperature 60° C.) so as to maintain a perimeter zone of the membrane S in contact with the layer 9 of 3-(trihydroxysilylpropyl)methacrylate (FIG. 6). In this way substantially irreversible chemical bonds were created between the membrane and the 3-(trihydroxysilylpropyl)methacrylate 9 (FIG. 17). It should be noted that the membrane S was positioned above apertures 2' of the channels 2 and that it comprises a deformable central zone.

EXAMPLE 2

This example describes the preparation of 3-(trihydroxysilylpropyl)methacrylate.

3-(trimethoxysilylpropyl)methacrylate (TMSPM-Fluka Italia) was hydrolysed with distilled water (molar ratio 1:1) leaving it under agitation inside a container positioned on a magnetic plate. The hydrolysis reaction was performed at ambient temperature for two hours and during said hydrolysis the groups —$OCH_3$ are substituted by hydroxyl groups according to the reaction:

$RSi(OCH_3)_3 + 3H_2O \rightarrow RSi(OH)_3 + 3CH_3OH$ (fast)

$RSi(OH)_3 \rightarrow R(Si)_2(OH)_4OR \rightarrow R(Si)_3(OH)_5(OR)_2$ (slow)

EXAMPLE 3

Figure 18:
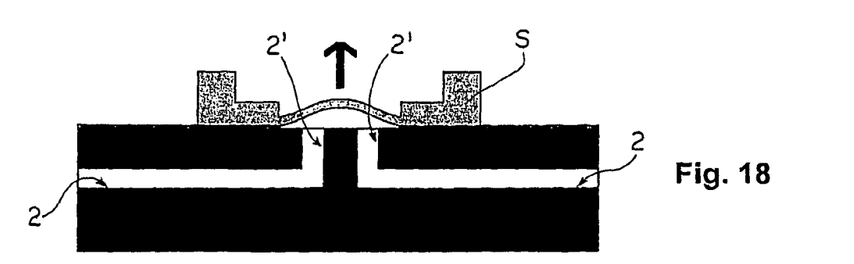
FIGS. 18 and 19 illustrate different operating phases of the valve of FIG. 7.
Figure 19:
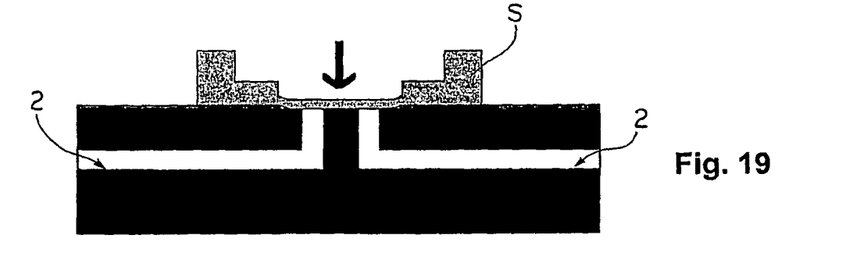

This example describes the operation of a valve (FIGS. 18 and 19).

The valve comprises a pneumatic actuator (known per se and not illustrated) positioned on the opposite side of the membrane S with respect to the apertures 2'. In use, when the actuator creates a vacuum on the membrane S, the membrane S moves away from the substrate 8' and connects the channels 2 (FIG. 18); when the actuator compresses the membrane S, the membrane S moves near to the substrate 8' and closes the apertures 2' (FIG. 19).

EXAMPLE 4

This example describes an alternative method for the production of a valve element V (FIG. 7).

An element 1 of PMMA (polymethylmethacrylate) (thickness 1 mm, width 70 mm, height 70 mm) was milled in order to obtain channels 2 (diameter approximately 200 μm) (FIG. 2) and then superimposed and glued to a further element 3 of PMMA (thickness 1 mm, width 70 mm, height 70 mm) in order to obtain a substrate 4. The gluing was performed following the method described in Lab Chip, 2006, 6, 66-73.

Figure 20:
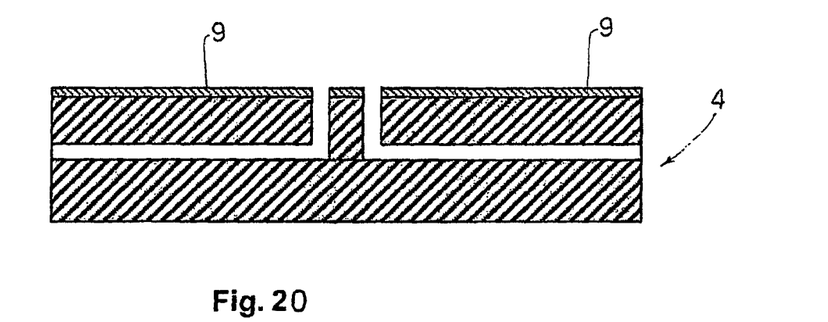
FIGS. 20 and 21 illustrate different phases of the production of a valve in accordance with the present invention.

At this point, the element 1 was coated with a layer 9 (with thickness of approximately 1 μm) of 3-(trihydroxysilylpropyl)methacrylate (FIG. 20).

FIG. 13 and the example show the set-up used to produce the coating.

Figure 21:
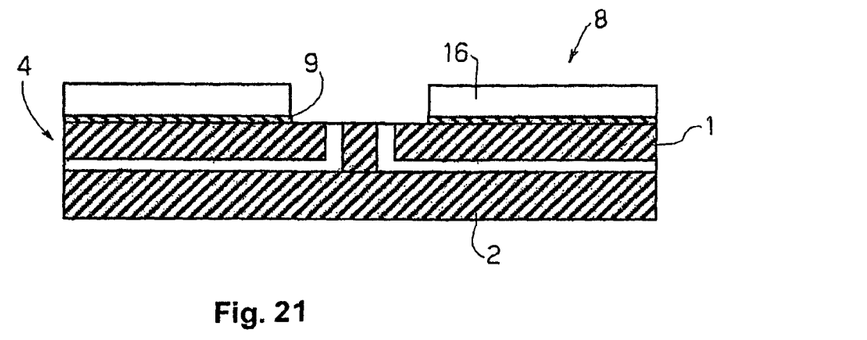

The layer 9 was partially covered by a mask 16 made of metal (in particular steel) and underwent plasma incision (at a power of 500 W for 90 seconds) in order to remove the portion(s) of the layer 9 not covered by the mask 16 (FIG. 21).

Figure 4:
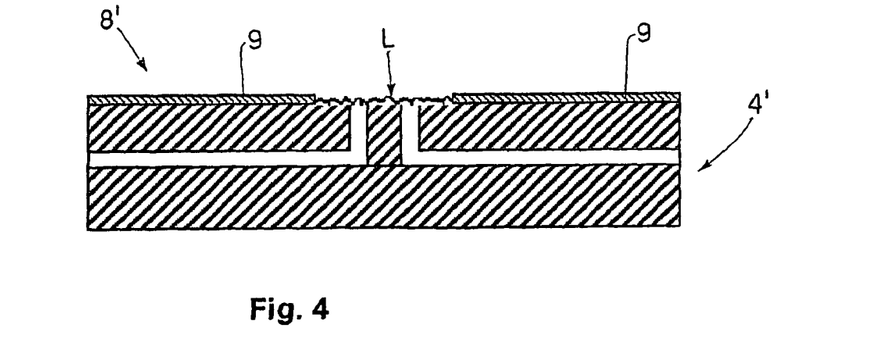
Figure 5:
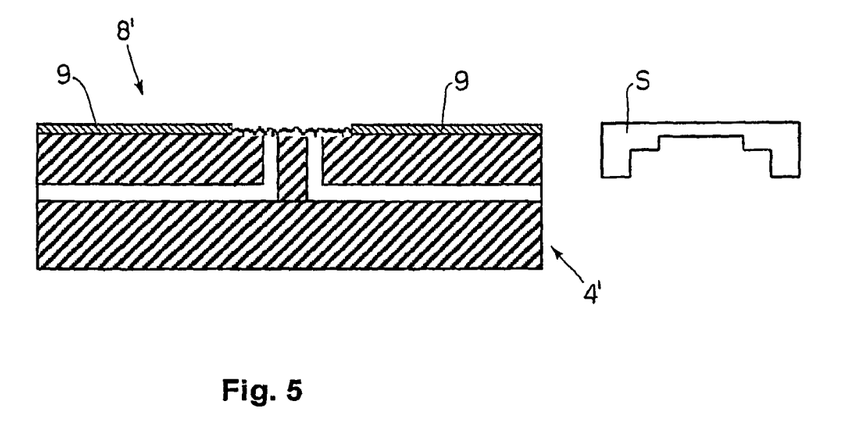

At this point, the procedure described in example 1 was followed starting from the illustration of FIG. 4.

The invention claimed is:

1. A method for bonding a substrate with at least one layer of silicone in order to obtain a composite, comprising:
   a first phase of application, during which a first layer comprising at least one organosilane is applied to at least one first surface of the substrate;
   a second phase of application, during which a second layer comprising silicone is applied on the first layer, wherein the organosilane has, during the second phase of application, at least one silicon bonded with at least one hydroxy;
   a phase of surface treatment, which precedes the first phase of application and during which at least either the first or a second surface of the substrate is treated so that the first surface has an angle of contact greater than an angle of contact of the second surface, wherein during the first phase of application, the organosilane deposits selectively on the first surface with respect to the second surface.

2. The method as claimed in claim 1, wherein the first surface of the substrate has an angle of contact of less than 90°.

3. The method as claimed in claim 1, wherein the first surface comprises at least one polymeric material.

4. The method as claimed in claim 3, wherein the polymeric material is an acrylic polymer.

5. The method as claimed in claim 1, wherein the organosilane has, before the second phase of application, a silicon bonded with three substituents chosen, independently of one another, from the group consisting of: hydroxy, alkoxy C1-C6.

6. The method as claimed in claim 5, wherein the organosilane, during the second phase of application, has a silicon bonded with three hydroxies.

7. The method as claimed in claim 1, wherein the organosilane has, during the second phase of application, formula R1Si(R2)3, wherein each R2 represents a hydroxy; R1 represents a methacrylic residue having the following structure:

in which R3 indicates an alkyl C1-C6.

8. The method as claimed in claim 1, wherein the silicone has the following formula:

in which n is a whole number greater than 4, each R is chosen, independently of the others, from the group consisting of: methyl, ethyl, propyl.

9. The method as claimed in claim 1, and comprising a phase of activation, which is subsequent to the first phase of application and during which the silicone and the organosilane are activated superficially by means of plasma treatment.

10. The method as claimed in claim 1, wherein the difference between the angles of contact of the first surface and the organosilane is less than 20°.

11. The method as claimed in claim 1, during the first phase of application, the first layer is applied by means of evaporation or atomisation and subsequent condensation of the organosilane.

12. The method as claimed in claim 1, wherein, after the surface treatment phase, the difference between the angles of contact of the first and second surface is at least 30°.

13. The method as claimed in claim 1, wherein, during the surface treatment phase, either the first or the second surface of the substrate is treated to give it a roughness different from the roughness of the other surface.

14. The method as claimed in claim 1, wherein, during the surface treatment phase, either the first or second surface undergoes plasma treatment.

15. The method as claimed in claim 1, wherein during the second phase of application the silicone bonds selectively with the first layer.

16. The method as claimed in claim 1 the substrate comprises at least two channels, each of which having a respective surface aperture; the surface apertures are positioned beside each other at the level of the second surface; the first surface extends around the second surface; during the second phase of application, the second layer is positioned above the second surface of the substrate so that a perimeter zone of said second layer positioned above the first layer bonds with the first layer itself; the second layer has a deformable central zone.

17. A method for bonding a substrate with at least one layer of silicone in order to obtain a composite, comprising:
   a first phase of application, during which a first layer comprising at least one organosilane is applied to at least one first surface of the substrate;
   a second phase of application, during which a second layer comprising silicone is applied on the first layer, wherein the organosilane has, during the second phase of application, at least one silicon bonded with at least one hydroxyl, and during the first phase of application, the organosilane deposits on the first and a second surface; and a phase of removal, during which the organosilane is selectively removed from the second surface while remaining on the first surface, wherein the organosilane is removed from the second surface by means of plasma incision.

* * * * *

UNITED STATES PATENT AND TRADEMARK OFFICE
CERTIFICATE OF CORRECTION

PATENT NO. : 8,557,350 B2  
APPLICATION NO. : 12/673273  
DATED : October 15, 2013  
INVENTOR(S) : Simone et al.

Page 1 of 1

It is certified that error appears in the above-identified patent and that said Letters Patent is hereby corrected as shown below:

In the Claims

In Column 10, Line 6, in Claim 7, delete "R1Si(R2)3, wherein each R2 represents a hydoxy; R1" and insert -- $R^1Si(R^2)_3$, wherein each $R^2$ represents a hydoxy; $R^1$ --, therefor.

In Column 10, Line 16, in Claim 7, delete "R3 indicates an alkyl C1-C6." and insert -- $R^3$ indicates an alkyl $C_1$-$C_6$. --, therefor.

In Column 10, Line 21, in Claim 8, delete "[R2SiO]n" and insert -- $[R_2SiO]_n$ --, therefor.

Signed and Sealed this  
Third Day of March, 2015

Michelle K. Lee  
*Deputy Director of the United States Patent and Trademark Office*